United States Patent [19]

Duval et al.

[11] 3,882,279

[45] May 6, 1975

[54] MULTI-STAGE MODULATOR SYSTEM

[75] Inventors: Georges Duval, Boulogne; Jacques Renaud-Goud, St. Michel sur Orge, both of France

[73] Assignee: Compagnie Indusrielle des Telecommunications Cit-Alcatel, Paris, France

[22] Filed: Oct. 24, 1973

[21] Appl. No.: 409,293

[30] Foreign Application Priority Data

Oct. 24, 1972 France .............................. 72.37679

[52] U.S. Cl. ............................................ 179/15 FD

[51] Int. Cl. ............................................ H04j 1/06

[58] Field of Search ................. 343/200; 179/15 FD

[56] References Cited

FOREIGN PATENTS OR APPLICATIONS 1,011,371 4/1952 France ........................... 179/15 FD

OTHER PUBLICATIONS

Telecommunications Magazine, Vol. 5, No. 1; Jan., 1971; pgs. 32, 34, 36 & 41.

*Primary Examiner*—Ralph D. Blakeslee
*Attorney, Agent, or Firm*—Craig & Antonelli

[57] ABSTRACT

Modulator equipment having several modulator stages providing several hundreds of channels, having a more economical construction than known equipment, due to the use of high transposition frequencies.

6 Claims, 1 Drawing Figure

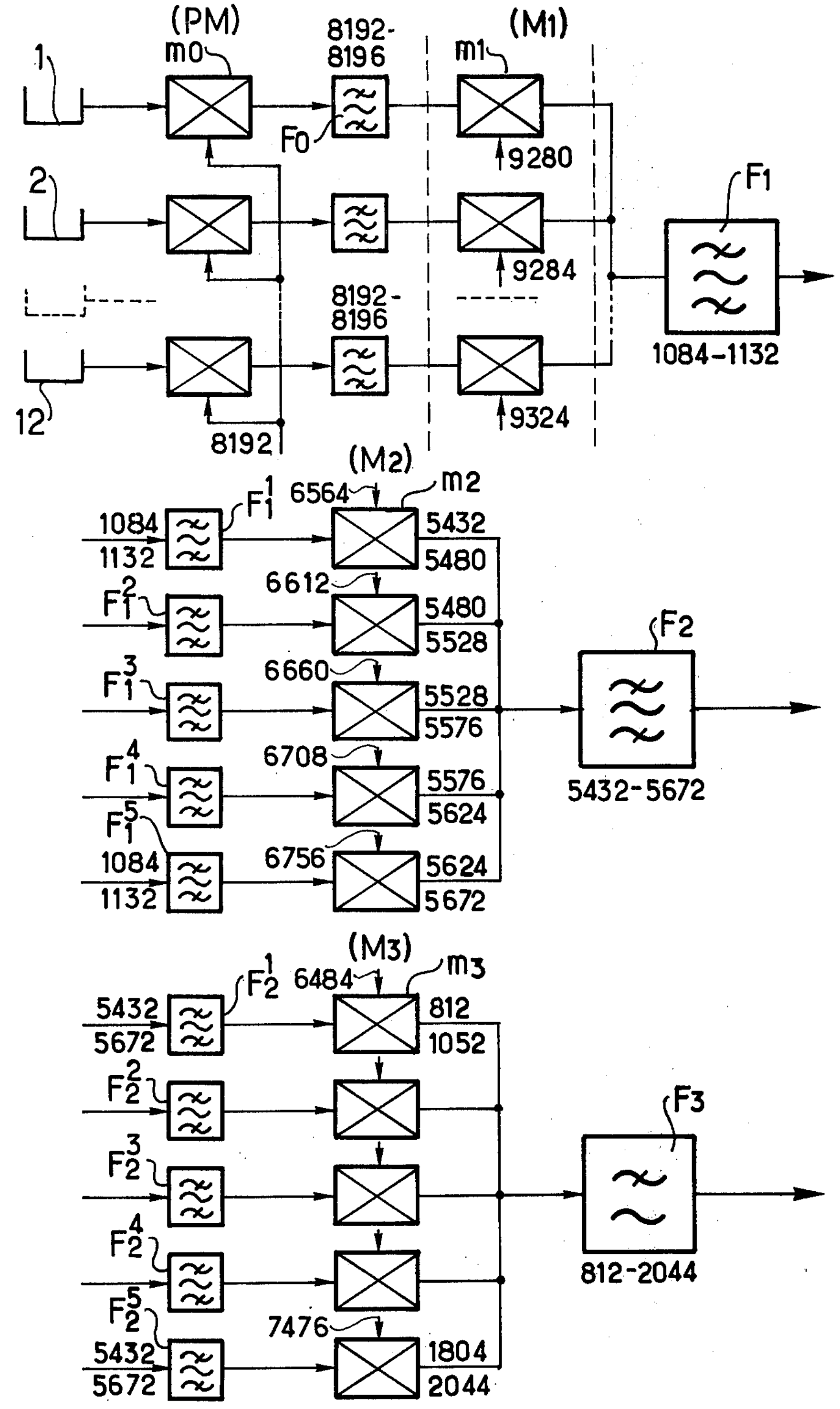
(PM)
m0
8192-8196
(M1)
m1
1
2
12
F0
9280
9284
9324
8192
F1
1084-1132
(M2)
m2
6564
6612
6660
6708
6756
1084 1132
$F_1^1$
$F_1^2$
$F_1^3$
$F_1^4$
$F_1^5$
5432 5480
5480 5528
5528 5576
5576 5624
5624 5672
F2
5432-5672
(M3)
m3
6484
7476
5432 5672
$F_2^1$
$F_2^2$
$F_2^3$
$F_2^4$
$F_2^5$
812 1052
1804 2044
F3
812-2044

MULTI-STAGE MODULATOR SYSTEM

The invention comes within the branch of equipment used in terminal stations of telephonic connections for constituting a multiple channel frequency multiplex system. It concerns a modulator equipment having several modulation stages capable of supplying several hundreds or several thousands of channels which are more economically constructed than known equipment.

It is a known practice to constitute a multiple telephone channel frequency multiplex system consisting of several hundreds of channels by means of a device having several spaced-out modulation stages. For example, a system considered as conventional, providing a group known as a "tertiary group" of 300 telephonic channels is constituted as follows:

1. A 24 c/s premodulation stage is followed by a first modulation stage which provides 12 channels spaced out between 60 and 108 kc/s. A two-stage line connector forms, firstly, three subgroups of four channels spaced out respectively, between 60 and 76 kc/s, 76 and 92 kc/s, between 92 and 108 kc/s. These three subgroups are then connected to form a "basic primary group" of channels covering the 60 to 108 kc/s band.

2. A second modulation stage (group modulation) transposes five basic primary groups in the 312 to 360 kc/s, 360 to 408 kc/s, 408 to 456 kc/s, 456 to 504 kc/s, 504 to 552 kc/s bands, respectively, and groups them together in a basic secondary group of 60 channels covering the 312 to 552 kc/s band.

3. A third modulation stage (group modulation) transposes five basic secondary groups having five places covering in all the 812 to 3044 kc/s band, this being a tertiary group of 300 channels having a total width of 1232 kc/s, with four interband gaps of 8 kc/s each. Another known solution consists in constituting a group of 16 secondary groups, this being 960 channels in all, taking up a spectrum of 60 to 4028 kc/s.

In equipment of this type, the most expensive elements are the filters.

On making up the balance sheet of the "filters" item of an equipment of a tertiary group of the conventional type, referred to summarily above, the following results are obtained:

1. For a channel connector: three subgroup filters, plus one 60 to 108 kc/s primary group filter, this being four filters per primary group. The complete 300 channel equipment contains 25 basic primary groups of 12 channels, that is, 100 filters for 25 channel connectors.

2. For the constituting of five secondary groups comprising each five primary groups: 25 filters.

3. For the constituting of a tertiary group, five filters. This makes a total of 130 filters.

With a view to constituting a group having the order 3 comprising several hundreds of channels, or possibly a group having a higher order than 3, comprising several thousands of channels, in the standard position, with a total number of filters less than that of known equipment, the invention provides, between the premodulation stage and the forming of a group having an order higher than 2, for the constituting of the groups having an order of 1, 2, . . . having frequency positions greater than the respective standard groups (standard 60 to 108 kc/s primary group, standard 312 to 552 kc/s secondary group). It will be shown in an example that this arrangement gives rise to great saving in the total number of filters of a modulation equipment, due to the fact that it enables, for all the orders of modulation, the subgroup level to be dispensed with and the outputs of the individual modulators on a single group filter to be coupled directly to a single group filter.

For that purpose, a "HF (high-frequency) primary group" convering, for example, the 1084 to 1132 kc/s band, a "HF (high-frequency) secondary group" covering, for example, the 5432 to 5672 kc/s band, are formed successively, to arrive at a tertiary group of five secondary groups, brought back into the standard 812 to 2044 kc/s band (or a group of 16 secondary groups brought back to the standard 60 to 4028 kc/s band).

The accompanying drawing gives a general diagram of an equipment for forming a tertiary group of 300 channels, with primary HF primary groups according to the invention. In the FIGURE, the notation kc/s has not been included. To make the FIGURE more easy to follow, it has been understood everywhere. The FIGURE should be read from left to right and from top to bottom.

Twelve voice-frequency channels, numbered from 1 to 12 undergo a premodulation (PM) in modulators such as mo, fed by a carrier having a relatively high frequency. For example, either 128 kc/s or 2,580 kc/s, or 8192 kc/s. The premodulated channels are extracted through 12 identical individual filters, covering either the 128 to 132 kc/s band in the first case, or the 2560 to 2564 kc/s band in the second case or the 8192 to 8196 kc/s band in the third case. The FIGURE illustrates the third case with a carrier at 8192 kc/s.

These 12 premodulated channels are transposed (modulation stage M1) in an HF primary group, in a 1084 to 1132 kc/s band, for example, by means of 12 modulators such as m1, fed by 12 different carriers spaced out between 9280 and 9284 kc/s in 4 kc/s increments (in the first case, 12 carriers spaced out between 1216 and 1260 kc/s would be obtained; in the second case, 12 carriers spaced out between 3648 and 3692 kc/s would be obtained).

The channel connecting stage is ended by a single filter F1, which extracts an HF primary group having a band of 1084 to 1132 kc/s.

At the second modulation stage (M2), five HF primary groups of 1084 to 1132 kc/s respectively, crossing five filters $F_1^1$, . . . $F_1^5$, identical to $F_1$ are transposed into an HF secondary group of 5432 to 5672 kc/s by means of five modulators such as m2, with five carriers, 6564, 6612, . . . 6756 kc/s. The secondary group thus formed is extracted downstream from a filter $F_2$ having a band of 5432 to 5672 kc/s.

At the third modulation stage (M3), five HF secondary groups crossing, respectively, five filters $F_2^1$, $F_2^2$, . . . $F_2^5$, all identical to $F_2$ are transposed into a (standard) tertiary group of 812 to 2044 kc/s, by means of five modulators such as *m*3 with five carriers of 6484 . . . 7476 kc/s. The tertiary group thus formed is extracted downstream from a low-pass filter $F_3$.

For an equipment according to the invention, as in the FIGURE, the following "filters" balance is established, starting from the channel connector:

25 type $F_1$ filters
5 type $F_2$ filters
1 type $F_3$ filter

This makes a total of 31 filters instead of 130 filters in conventional equipment.

Saving is effected by dispensing with the filters of subgroups in the channel connector stage and with the filters connected with each individual modulator in the other stages.

Another industrially very important advantage results therefrom. At the level M2 on the one hand and at the level M3 on the other hand, all the element boxes are identical to one another, respectively.

For the constituting of a group of sixteen secondary groups comprising 960 channels, there would be the same saving and advantages.

Identical general configurations could be obtained with premodulation frequencies of 128 kc/s or 2,560 kc/s.

All the preceding numerical values are given exclusively by way of an example and could be subjected to alterations within the scope of the invention.

More particularly, the same process could be applied to the forming of a group having a higher order than 3, totaling several thousands of channels, by choosing appropriate modulation frequencies.

The non-standard groups of lower order may be brought back into the standard band by a modulation of a single group.

What is claimed is:

1. A multi-stage modulator system for forming, starting from voice frequency channels, a standard frequency multiplex group, comprising a first modulator group including a plurality of premodulated voice frequency channels each having a first modulator receiving respective input signals and respective modulation signals and a first filter connected directly to the outputs of said first modulators in common, a second modulator group including a plurality of second modulators each receiving the output of said first filter and a respective modulation signal and a second filter connected directly to the outputs of said second modulators in common, and a third modulator group including a plurality of third modulators each receiving the output of said second filter and a respective modulator signal and a third filter connected directly to the outputs of said third modulators in common, each of the modulators of each modulator group supplying a single modulation sideband within a given frequency band.

2. A multi-stage modulator system as defined in claim 1 wherein said first modulator group further includes a respective premodulator connected in each channel to receive a respective one of said input signals and a common modulation signal, the outputs of said premodulators being connected to the inputs of respective first modulators in the respective channels.

3. A multi-stage modulator system as defined in claim 2 wherein said second modulator group further includes a plurality of fourth filters connecting the output of said first filter to each of said second modulators.

4. A multi-stage modulator system as defined in claim 3 wherein said third modulation group further includes a plurality of fifth filters connecting the output of said second filter to each of said third modulators.

5. A multi-stage modulator system as defined in claim 4 wherein said first modulation group further includes a plurality of sixth filters interconnecting said premodulators to said first modulators.

6. A multi-stage modulator system for converting voice frequency channels into a standard frequency multiplex group comprising $n$ modulator stages, where $n$ is an integer equal to or greater than 2, each modulator stage lower than the $n^{th}$ stage including a plurality of modulator groups, the $n^{th}$ stage having a single modulator group supplying said standard frequency multiplex group, each modulator group comprising a plurality of modulators having one input connected to receive a respective modulation signal and a second input connected to receive a respective input signal, the second inputs of the modulators in the first multiplex stage being connected to means providing respective premodulated voice frequency channels, the second inputs of the modulators in the multiplex stages subsequent to the first multiplex stage being connected to the respective outputs of modulator groups of one unit lower rank in the preceding modulator stage, each of the modulators of each individual group supplying a single modulation sideband within a given frequency band at the output of the modulator group and having their outputs directly coupled in common connection to a single group band-pass filter.

* * * * *